United States Patent [19]

O'Donnell et al.

[11] Patent Number: 4,918,548
[45] Date of Patent: Apr. 17, 1990

[54] CARTRIDGE LOADER

[75] Inventors: Miles C. O'Donnell, Andover; Edward Steltzer, Westboro, both of Mass.

[73] Assignee: Digital Equipment Corporation, Maynard, Mass.

[21] Appl. No.: 191,617

[22] Filed: May 9, 1988

[51] Int. Cl.⁴ .............................................. G11B 15/68
[52] U.S. Cl. ........................................ 360/92; 369/34
[58] Field of Search .................... 360/92, 98.04–98.06; 369/34, 36–39, 35; 414/273, 276, 277, 280–283, 659–663

[56] References Cited

U.S. PATENT DOCUMENTS

3,879,758  4/1975  Pyles ...................................... 360/22

Primary Examiner—A. J. Heinz
Attorney, Agent, or Firm—Fish & Richardson

[57] ABSTRACT

A tape drive is mounted on a carriage alongside a horizontal or vertical rack of tape cartridges. The carriage supports an arm with a linear actuator for removing a selected cartridge from the rack and inserting it in the tape drive and for extracting the cartridge from the drive and returning it to the rack. The actuator advances a cartridge in the insertion stroke by pushing it from the back and in the extraction stroke by hooking a notch on the cartridge.

36 Claims, 10 Drawing Sheets

INSERTION
FIG. 8C

FIG. 8B

EXTRACTION
FIG. 8D

CARTRIDGE LOADER

BACKGROUND OF THE INVENTION

The present invention relates to systems for automatically loading data storage modules, such as tape cartridges, into a drive.

In many data processing environments, it would be desirable to have online access to a selection of data storage cartridges mountable on a single drive. In the past, tapes selected from extensive collections of tape cartridges or reels have been retrieved and mounted largely by hand. Users with very large data storage requirements, or the need to back up a number of disk drives or furnish archive storage online would be better served in many instances by a system allowing several tape cartridges to automatically share a single drive.

SUMMARY OF THE INVENTION

The present invention has several interrelated aspects. In one general aspect of the invention, a drive loading system for data storage modules is furnished by combining a rack having parallel slots for a plurality of data storage modules with a drive mounted on a movable carriage designed to align the drive operatively with a slot on a rack so that a linear actuator can remove a selected module from a slot in the rack and insert it into the drive and can withdraw the module from the drive and return it to the same slot in the rack. In the preferred embodiment, the linear actuator includes a pivoting hook-like pawl positioned to positively engage the module during the extraction stroke to pull the module out of the drive and back into its respective slot in the rack. The pawl is preferably designed to push the module out of the respective slot into the drive during the insertion stroke. The linear actuator includes an arm preferably mounted on the carriage perpendicular to the rack extending from the carriage over and past the rack. A lead screw mechanism carried by the arm includes a lead screw, a traveller coupled for advancement by the lead screw, a data storage module mover coupled to the traveller having a movable frame, a surface connected to the frame for pushing against the back of the module on the insertion stroke and an implement connected to the frame to catch hold of the module to withdraw it during the extraction stroke. The module mover is resiliently slidably coupled to the traveller. Where the drive includes an insertion/lock lever or similar activator, a projection is provided on the traveller for tripping the lever at the end of the insertion stroke.

In the specific preferred embodiment, the system is designed for loading tape cartridges having an exterior or peripheral notch. The implement on the traveller is a pawl pivotably mounted to the frame of the module mover. The pawl has an extension positioned to engage a back stop on the arm at the end of the retraction stroke to pivot the pawl out of the way to disengage the notch on the module while the module is being returned to the respective slot to allow the carriage to advance to a new position along the rack.

In the detailed embodiment, the pawl has a pivot point which creates an interference fit between the notch and the end tooth of the pawl during the extraction stroke. The pawl is in the form of a crank with an arm ending in a tooth which engages the notch on the cartridge. The crank has a surface between the tooth and the pivot point for pushing against the back of the cartridge during the insertion stroke while the tooth rides idly within the notch. At the end of the insertion stroke, an extension on the crank engages a projection on the drive which allows the pawl to pivot out of the way.

Another general aspect of the invention is the provision of a vertical rack with slots for a stack of data storage modules such as tape cartridges, accessed by a horizontal drive mounted on an elevator carriage alongside the rack. The elevator carries an arm with a linear actuator preferably of the aforementioned push/pull description for inserting and extracting the data storage module from the drive. In the preferred embodiment, the platform for the elevator carriage is supported at a midpoint by a horizontal arm like a shelf bracket raised or lowered by a lead screw at one side of the platform.

An important attribute of the invention lies in its methodology for automatic handling of tape cartridges and the like. In particular, cartridges may be placed in (or removed from) slots in an open rack and accessed automatically by moving a carriage supporting a drive into operative alignment with a slot. Next, the cartridge is advanced toward the drive in an insertion stroke by pushing it from the back with a linear actuator. After usage, the cartridge is retracted by hooking a notch on the periphery of the cartridge and dragging it back into its slot in the rack by means of the same linear actuator. In the preferred method, the same linear actuator trips a final insertion/lock lever on the drive at the end of the insertion stroke.

Orienting the rack vertically and using an elevator to move the carriage minimizes the space requirements and enables compliance with standard half rack space constraints. Providing the insertion/retraction arm on the carriage not only enables the tape drive to be juxtaposed with the selected slot on the rack to minimize the travel of the cartridge, but also allows the other sides of the cartridges to be relatively free of obstruction to allow easy access to load the rack by hand. Within the confines of a standard half rack space, the vertical system allows a standard tape cartridge drive to directly access up to six cartridges without user intervention.

BRIEF DESCRIPTION OF THE DRAWINGS

The drawings are briefly described as follows.

DESCRIPTION OF THE PREFERRED EMBODIMENTS

The embodiments described below are designed for implementing a cartridge loader capable of selecting at random, loading and unloading any one of a number of tape cartridges into a tape drive such as the drive on which the Digital Equipment Corporation TK/50 drive unit is based. The TK/50 tape cartridge is a single reel of tape in a 4×4×1 inch box having a peripheral notch called the interposer notch located on one of the edges. The TK/50 drive employed in the preferred embodiments includes a takeup reel and is essentially a standard configuration drive except for changes to the bezel to accommodate automatic operation.

The requirements for loading a drive such as the TK/50 are essentially that the cartridge be inserted into the drive cartridge receiving chamber without violating the "envelope" or exterior dimensions of the drive and also that the final insertion/lock handle or lever be actuated placing the drive and cartridge in mechanically ready condition. The horizontal and vertical embodiments depicted in this application employ a six cartridge rack although the specific embodiment is intended for racks of five to ten cartridges and may be extended to any feasible number.

Horizontal Rack

Horizontal rack 10 includes six or more slots for tape cartridges 12. The front 10a of the rack is open to operator access for loading and unloading identical cartridges 12 from the rack 10. A movable carriage 14 is mounted for translation along the rack 10 on a pair of guide rails 16 by a lead screw 18 driven by motor 20. A nut or traveller 22 connected to the carriage 14 is threaded on the lead screw 18 so that when the lead screw rotates, the carriage 14 travels forward or backward along rails 16.

Figure 1:
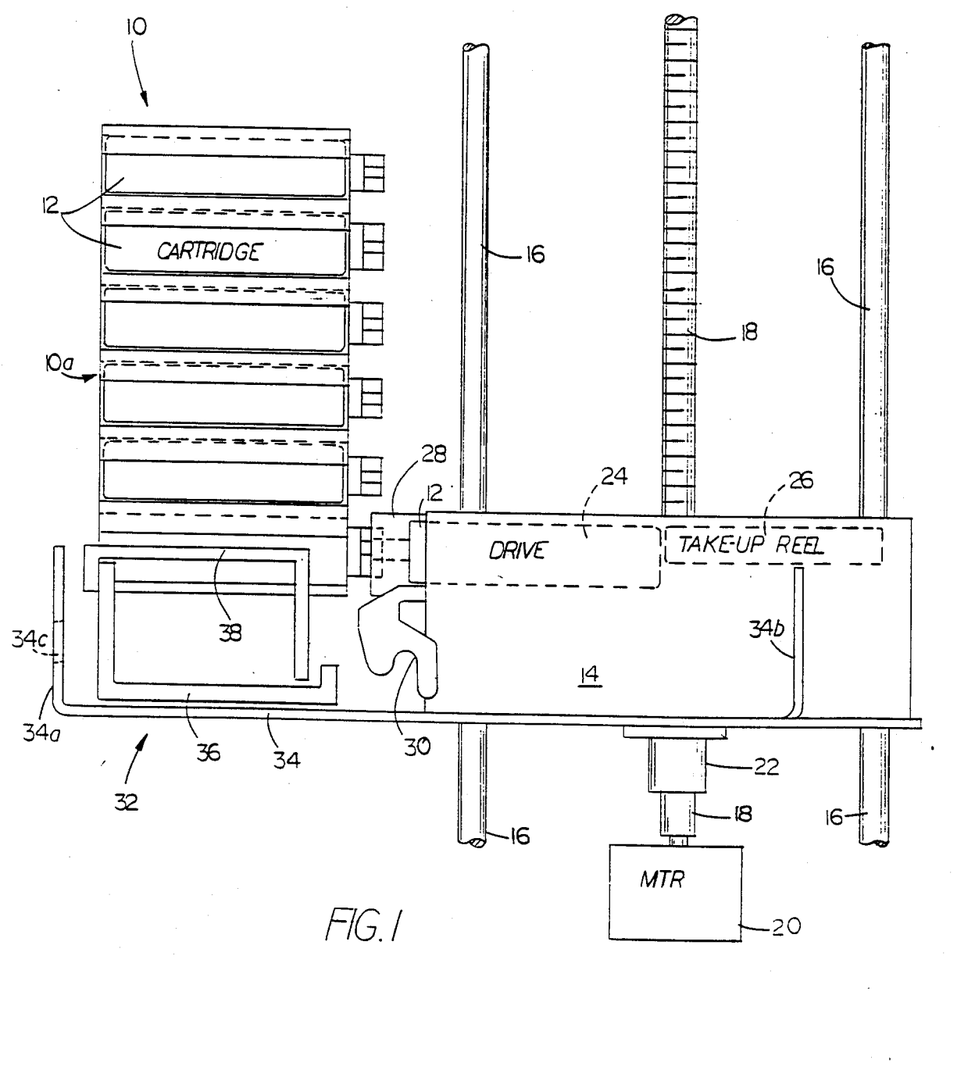
FIG. 1 is a plan schematic view of a cartridge loader with a horizontal rack according to the invention.
Figure 2:
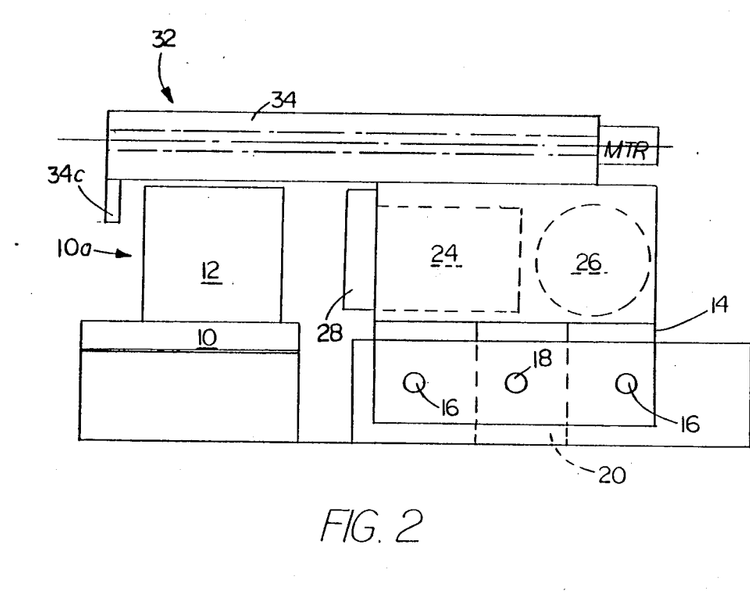
FIG. 2 is a side schematic view of the cartridge loader of FIG. 1.
Figure 3:
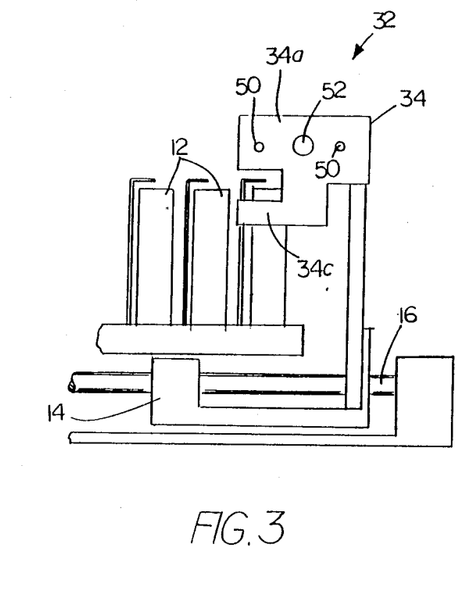
FIG. 3 is a partial front schematic view of the cartridge loader of FIG. 2 showing the end of the carriage's cartridge arm.

Carriage 14 supports a tape drive unit 24 with a takeup reel 26 as indicated in FIGS. 1 and 2. The drive 24 is a TK/50 type drive equipped with a rectangular frame-like bezel 28 and a handle 30 shown in the unlocked position. Carriage 14 also supports a cartridge manipulator arm 32 including an elongated U-shaped frame or bracket 34 housing an insertion/extraction lead screw assembly described in detail in FIG. 6 below. The manipulator arm includes a L-shaped traveller 36 slidably interlocked with an opposed L-shaped cartridge mover 38 as shown in FIG. 1.

Figure 4:
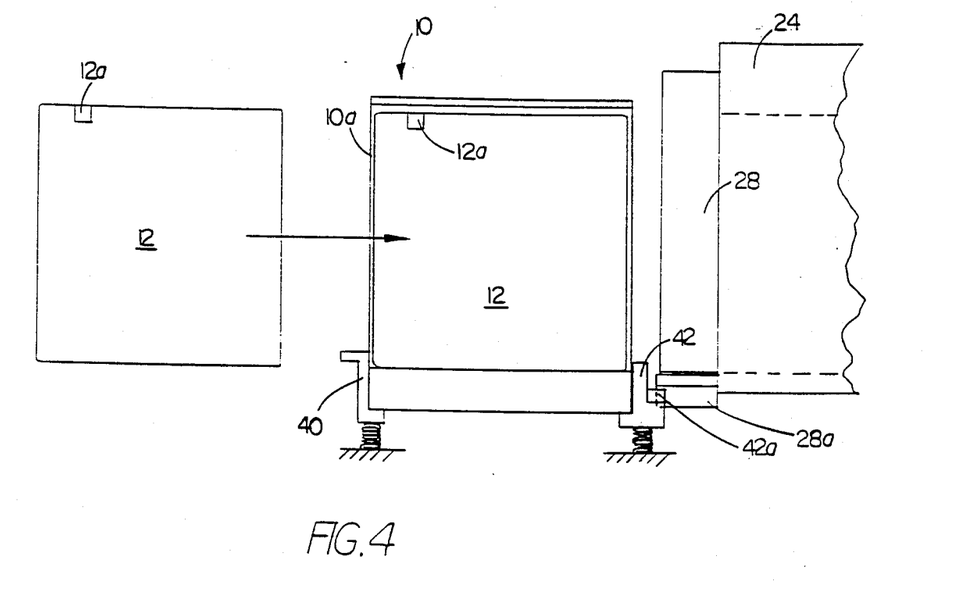
FIG. 4 is a schematic representation of the rack load/unload operation in a side view.
Figure 5:
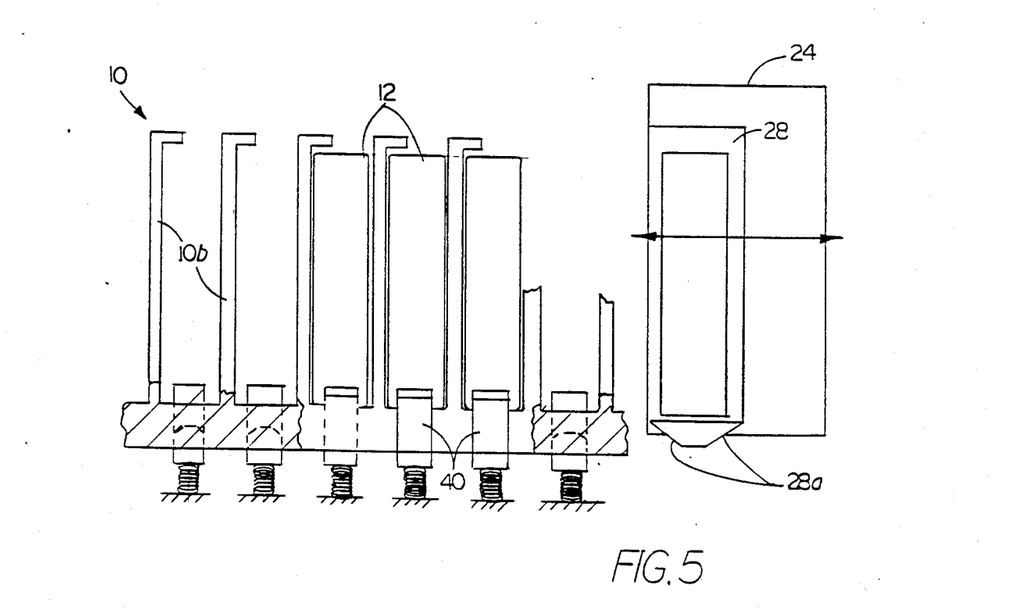
FIG. 5 is a schematic representation of a front view of a cartridge rack.

As shown in FIGS. 4 and 5, a cartridge 12 with peripheral notch 12a is loaded into the rack 10 by depressing the spring-loaded retainer foot 40 by hand and inserting the cartridge into the rack and releasing the retainer 40. The rack 10 consists of a comb-like structure with upstanding flanged partitions 10b defining parallel cartridge slots. The cartridge 12 is prevented from falling out of the other side of the rack 10 by means of a spring-loaded back stop 42 located at the foot of the other side of the cartridge 12. One retainer 40 and one stop 42 are provided for each slot. The entire rack 10 including the spring-loaded retainers 40 and 42 may be designed to be removable as a portable transport and storage tray, or it can be permanently secured in place.

As shown in FIGS. 1 through 5, the carriage 14 is advanced by the screw drive into position to select a desired cartridge 12 from the rack 10. As the tape drive 24 approaches the cartridge selected for insertion, a ramp 28a formed preferably as part of the bezel framing the entrance to the tape drive 24 contacts a mating ramp 42a formed on the back stop 42 for the selected slot. As the carriage moves into position for insertion of the cartridge into the tape drive, the back stop 42 is thus forced to move downward out of the way so that the cartridge can be removed from the rack (to the right as viewed in FIG. 4) and loaded into the tape drive 24.

Figure 7A:
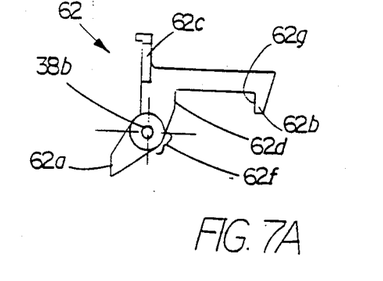
FIGS. 7A and 7B are side and front views, respectively, of the extraction pawl on the carriage arm of FIG. 6.
Figure 7B:
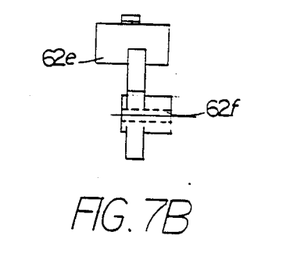
Figure 8A:
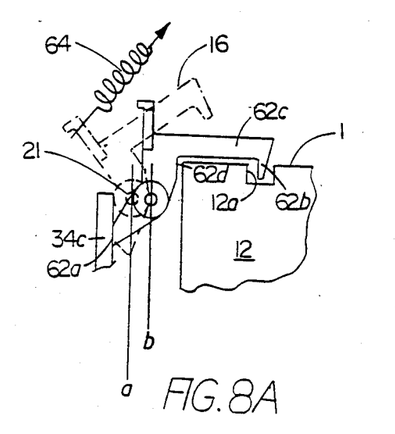
FIGS. 8A, 8B and 8C are a schematic representation of the pawl during the beginning and end portions of the insertion stroke of the cartridge arm of FIG. 6.
Figure 8B:
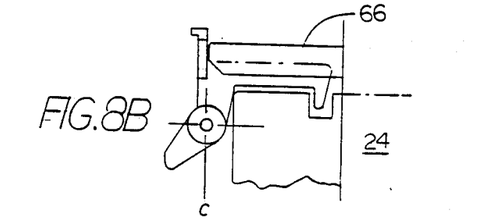
Figure 8C:
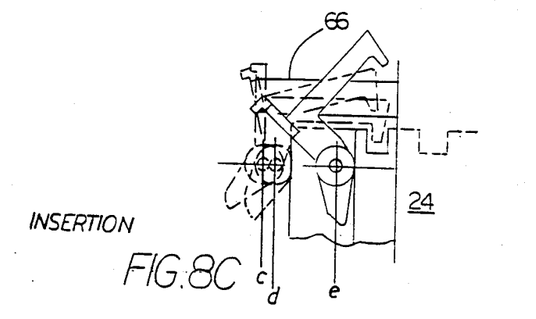
Figure 8D:
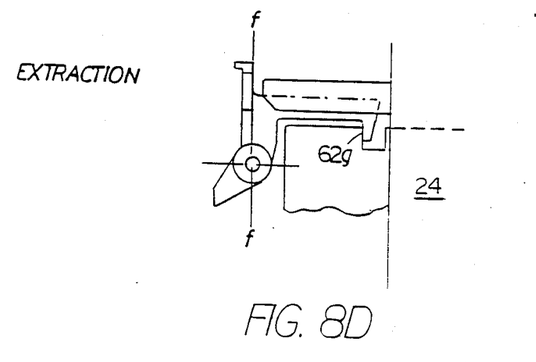
FIGS. 8D and 8E are side schematic representations of the beginning and end of the extraction stroke of the cartridge arm of FIG. 6, respectively.
Figure 8E:
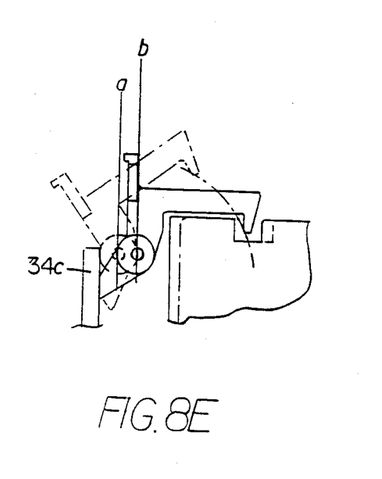
Figure 9:
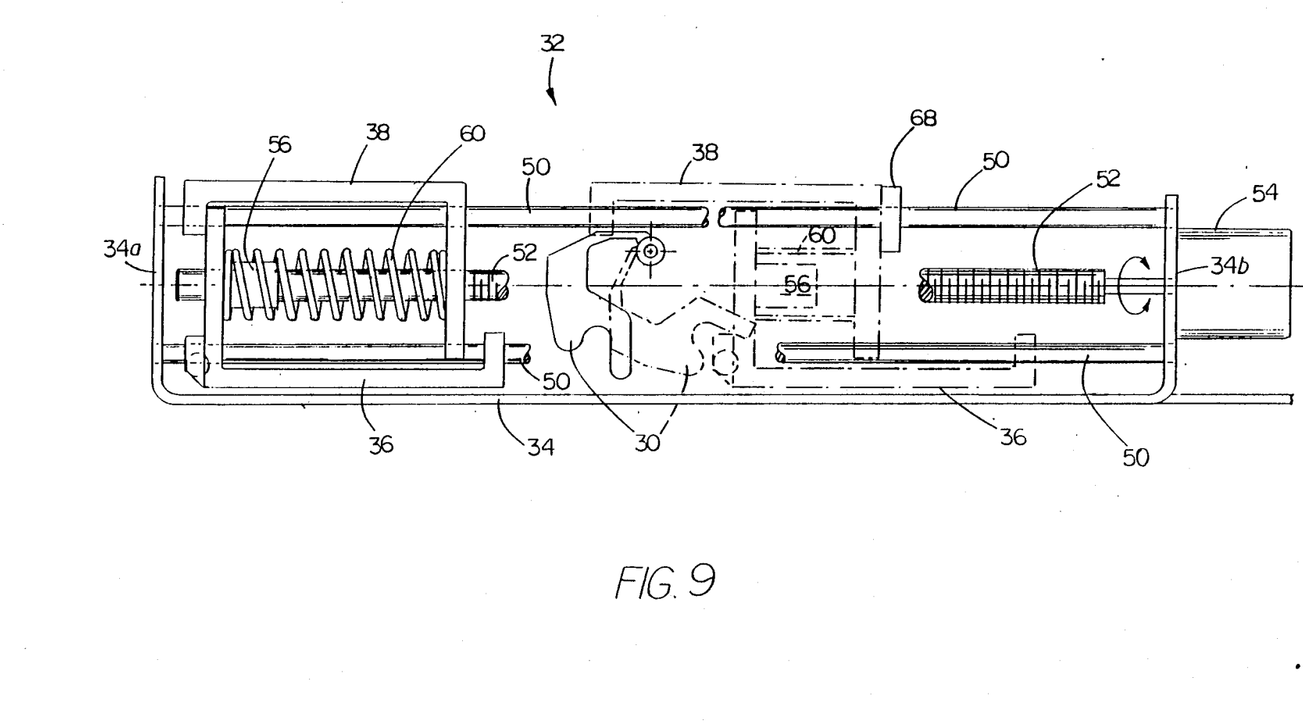
FIG. 9 is a plan view of the cartridge arm in the fully extracted condition as in FIGS. 1 and 6 with the end of insertion stroke indicated in phantom as in FIG. 6.

The cartridge manipulator arm 32 is shown in detail in FIGS. 6-9. The cartridge mover 38 and traveller 36 are shown both in the fully extracted position in solid lines in FIG. 6 and in the fully inserted position (phantom lines). Bracket 34 (FIG. 9) supports a pair of elongated guide rails 50. Between and parallel to the rails 50, a lead screw 52 is journalled in the bracket 34 for rotation by another motor 54 mounted on the outside of the "in-bound" end of the bracket 34. Traveller 36 is secured to a nut 56 threaded on the lead screw 52. Thus, when motor 54 turns screw 52, traveller 36 moves backward or forward along the arm 32. Traveller 36 has holes to receive one of the rails 50 and is notched at the other end of the traveller to ride on the other rail 50. Similarly, the cartridge mover 38 is apertured to receive the other rail 50 and is notched at its other end to ride on the opposite rail. Because of their complementary arrangement, as shown in FIG. 9, the traveller and cartridge mover 38 are slidably interlocked. Surrounding the nut 56 and lead screw 52, a compression spring 60 is interposed between the traveller and cartridge mover 38 to force the two elements apart as shown in FIG. 9.

Figure 6:
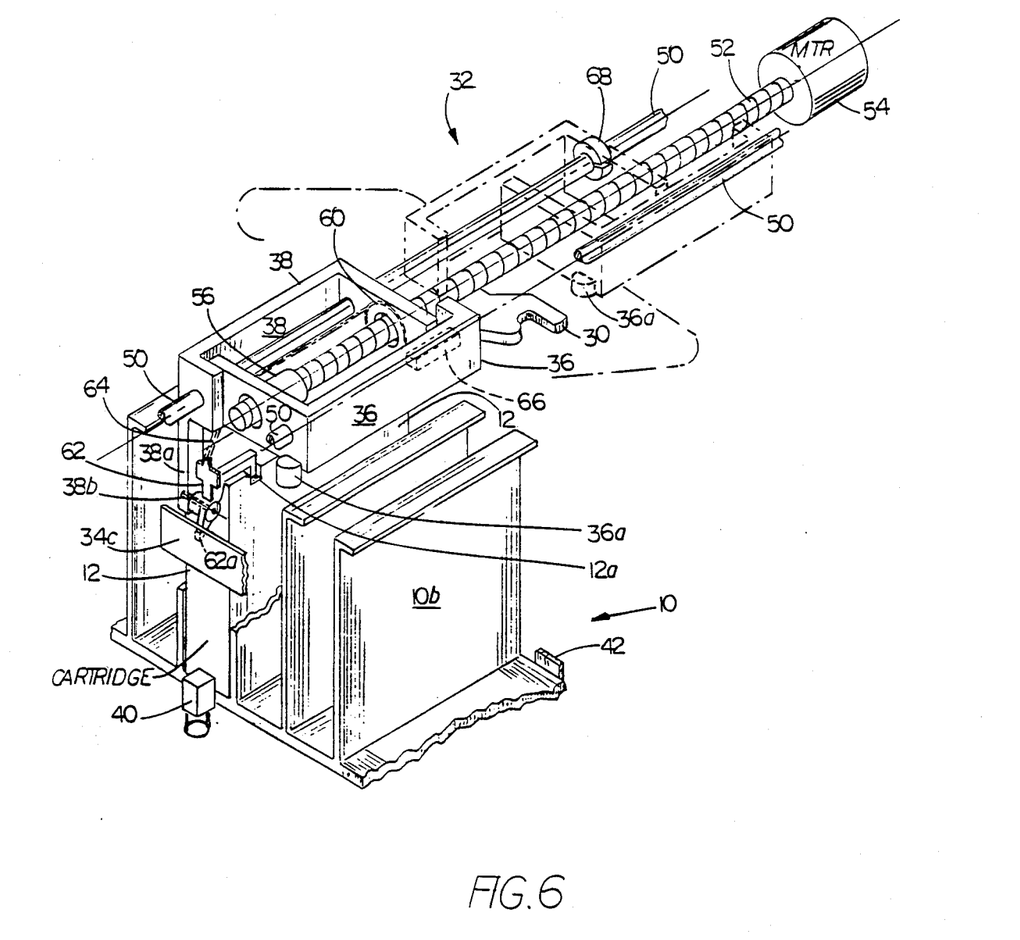
FIG. 6 is a perspective view of the carriage's cartridge arm in the fully extracted condition over a portion of the horizontal rack and illustrating in phantom the end of the insertion stroke.

As shown in FIG. 6, the cartridge mover 38 has a depending arm 38a carrying a horizontal pin 38b on which a pawl 62 is pivotably mounted. A tension spring 64 connects the top of the pawl to the underside of the mover frame 38. The detailed configuration of pawl 62 is shown in FIGS. 7A and 7B and is referred to below. The traveller 36 includes a depending projection or cog 36a which is designed to engage the handle 30 on the tape drive 24 at the appropriate time.

Spring 64 exerts a constant clockwise rotational force on the pawl 62. However, the compression spring between the interlocked traveller and cartridge mover exerts a force greater than any force the pawl 62 encounters during insertion. Thus, the interlocking parts 36 and 38 travel as one until carriage insertion is complete.

Insertion

The initial position of the pawl as shown in FIG. 8A is at position a, at which point surface 62a is against back stop plate 34c (FIG. 3), part of the bracket 34 in which the lead screw assembly is mounted. Thus, the pawl 62 is in the raised position clear of the rack 10, as shown in FIG. 8A. In this position, the insertion/extraction mechanism 32 and the tape drive 24 may be moved to select any desired cartridge 12 by advancing the carriage. Once the carriage stops at the selected cartridge position, to begin the insertion stroke, the motor 54 starts turning the lead screw 52 which causes the traveller 36 to move to the right, i.e., toward the motor. Due to the stiffness of spring 60, the cartridge mover 38 carrying the pawl 62 follows essentially immediately and allows the pawl to move slightly away from the plate 34c under the action of the tension spring 64. The pawl 62 rotates clockwise until the tooth 62b on the end of arm 62c is resting fully within the notch 12 on the cartridge 12 as shown in FIGS. 6 and 8A. Stop 42 (FIGS. 4 and 5) remains depressed by the edge of the bezel 28a on the tape drive. With motor 54 still running, as the pawl moves forward, flat surface 62d comes into contact with the back of the cartridge 12 and starts pushing the cartridge out of the slot in the rack. At position c (FIG. 8C), flag-like plate 62e comes into contact with post 66 (FIG. 6) which comprises part of the bezel 28 on the drive 24. At this point, the tooth 62b must get out of the notch 12b to avoid jamming as the notch enters the tape drive. It is important that neither the pawl nor any other mechanism enter the envelope or volume of the tape drive 24. As the pawl moves to position d (FIG. 8C), plate 62e is held back by the post 66 thus forcing the pawl counterclockwise about the pivot pin 38b. This causes surface 62d to rotate back at nearly the same rate as the pivot pin and surface 62f, the hub of the pawl, (FIG. 7A) are moving forward. The net effect of this combined action is that the cartridge notch 12b remains nearly stationary while the tooth 62b escapes. When hub 62f contacts the cartridge 12 at position d, forward motion of the cartridge resumes until fully inserted at position e (FIG. 8C). At this point, the cartridge mover 38 is stopped by a clamp 68 on one of the rails 50 (FIG. 9). Clamp 68 not only stops the cartridge mover 38 but also stops the forward progress of the cartridge and eliminates jamming beyond optimum insertion position.

After the cartridge 12 is fully inserted into the tape drive 24, the handle 30 must be rotated counterclockwise (FIGS. 6 and 9) to activate the tape drive 24. When the cartridge mover 38 stops at the clamp, the cog 36a on the traveller 36 is in a position to engage the handle 30. As the lead screw 52 continues to rotate, the traveller 36 continues to move even though the cartridge mover 38 remains stationary, resulting in compression of the spring 60. As the traveller continues to move, the cog 36a engages the handle and rotates it until the tape drive 24 is fully activated. At this point, the lead screw motor 54 receives a signal to stop and the tape drive is now free to function.

Extraction

When the tape drive is ready to eject a cartridge 12, the motor 54 receives a signal to drive the lead screw in the opposite direction such that the traveller 36 is driven back towards the rack 10. The cog 36a on the traveller engages the handle 30 and drives it clockwise to deactivate the tape drive and trigger an ejection mechanism internal to the tape drive 24 which will continue to push the cartridge until the pawl 62 reaches position d (FIG. 8C). At the position where the cog 36a has rotated the handle to its full open position, the cog is free to slip by the handle 30 because the notch in the handle is open on the side facing the rack 10. At this point, the traveller 36 is back in contact with the cartridge mover 38 thus as the lead screw continues to turn, it drives both the traveller and cartridge mover and thus carries the pawl with the cartridge mover along the arm 32. As shown in FIG. 9, the ejection mechanism in the tape drive continues to push the cartridge 12 out and against surface 62f of the pawl until position d is reached (FIG. 8). At this point, the ejection mechanism stops pushing so that the cartridge 12 becomes stationary. As the pawl 62 moves to position c, it rotates clockwise until tooth 62b is fully inserted in the notch 12b. As the pawl 62 moves to position b, the inside surface 62g of the tooth contacts the side of the notch and proceeds to withdraw the cartridge from the tape drive until position b is reached. It should be noted that due to the arrangement of the pivot pin 38b relative to the surface 62g, the pawl 62 becomes self-locking in an interference fit condition. Thus, the spring 64 need not be of high strength. As position b is reached, surface 62a comes into contact with plate 34c (FIG. 8E). The final movement to position a causes the pawl 62 to rotate counterclockwise away from the cartridge 12 until it is completely out of the way. During this final motion, surface 62g moves through an arc which both clears it of notch 12b and places the cartridge in its original position in the rack 10. This completes the extraction stroke so that the stack loader can begin another cartridge selection.

It should be noted that the function of the pawl 62 is not affected by slight variations in location of the cartridge 12 in the rack. If the cartridge is closer than normal to the pawl 62, it will simply be pushed into its proper position prior to the tooth 62b moving into the notch 12b. If the cartridge is farther than normal from the pawl 62, the tooth will simply come down on top of the cartridge and slide along until it snaps into the notch. If the cartridge is completely forward of the pawl 62, the pawl, which is restrained from rotating much beyond its normal clockwise position, will move forward until it contacts the cartridge 12 at which point the tooth will ride over the corner of the cartridge then slide along until it snaps into the notch.

Vertical Rack

A vertical embodiment of the rack and carriage system of FIG. 1 is shown in FIGS. 10-13. In this embodiment, the cartridge loader arm is implemented in the same fashion as the horizontal version. The basic design of the rack 10 is similar as well. The main difference is in the carriage assembly which, in this case, must be an elevator.

Figure 10:
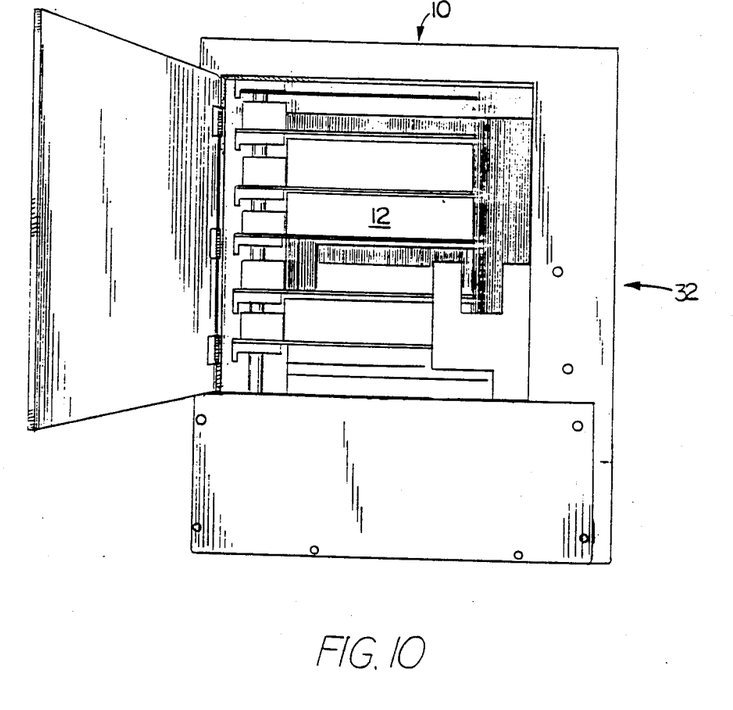
FIG. 10 is a schematic representation of an end view of another embodiment of the invention with a vertical rack.
Figure 11:
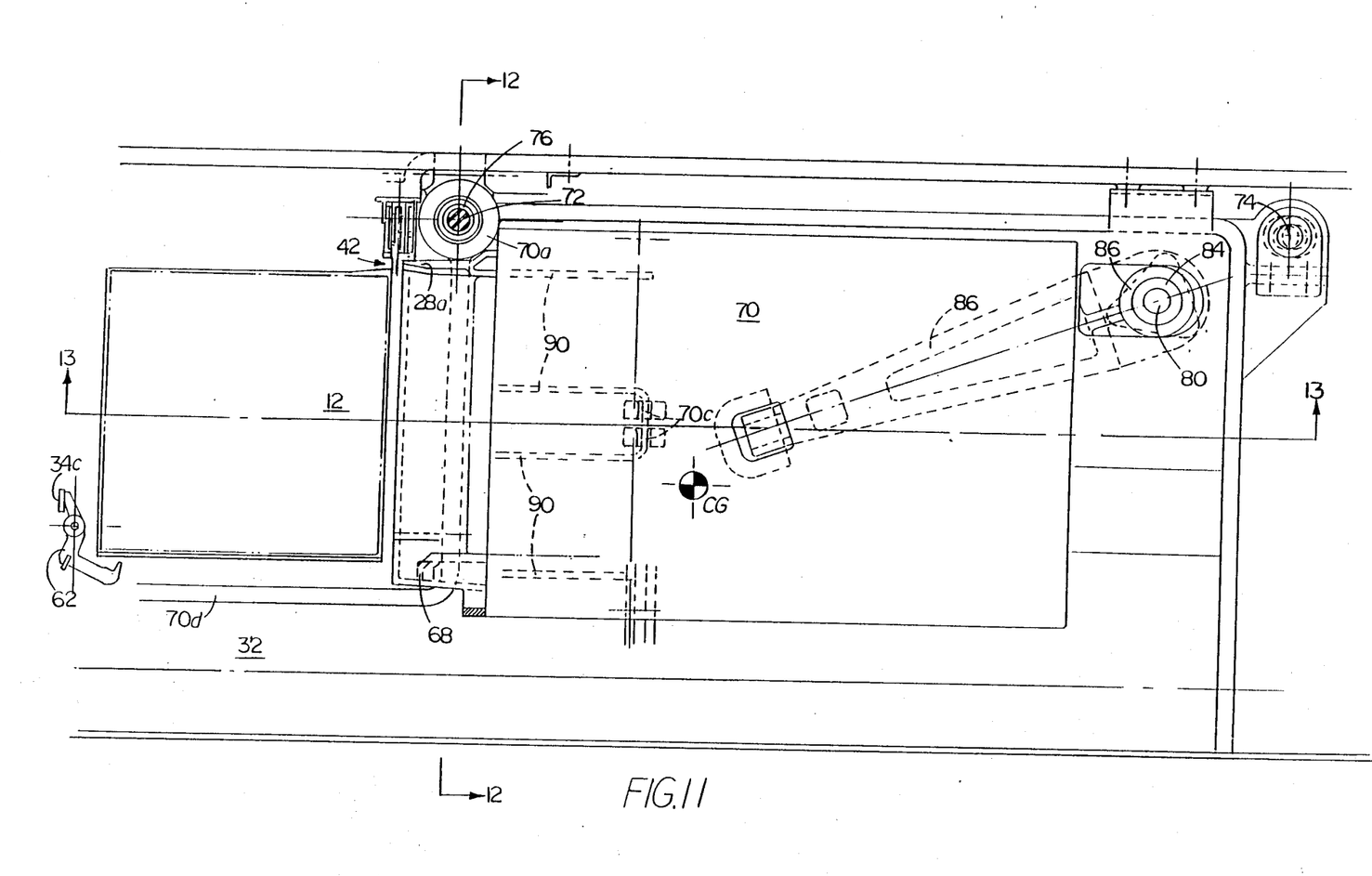
FIG. 11 is a plan view of the elevator carriage and rack of the embodiment of FIG. 10, showing the extraction pawl without the rest of the carriage's cartridge manipulator arm.
Figure 12:
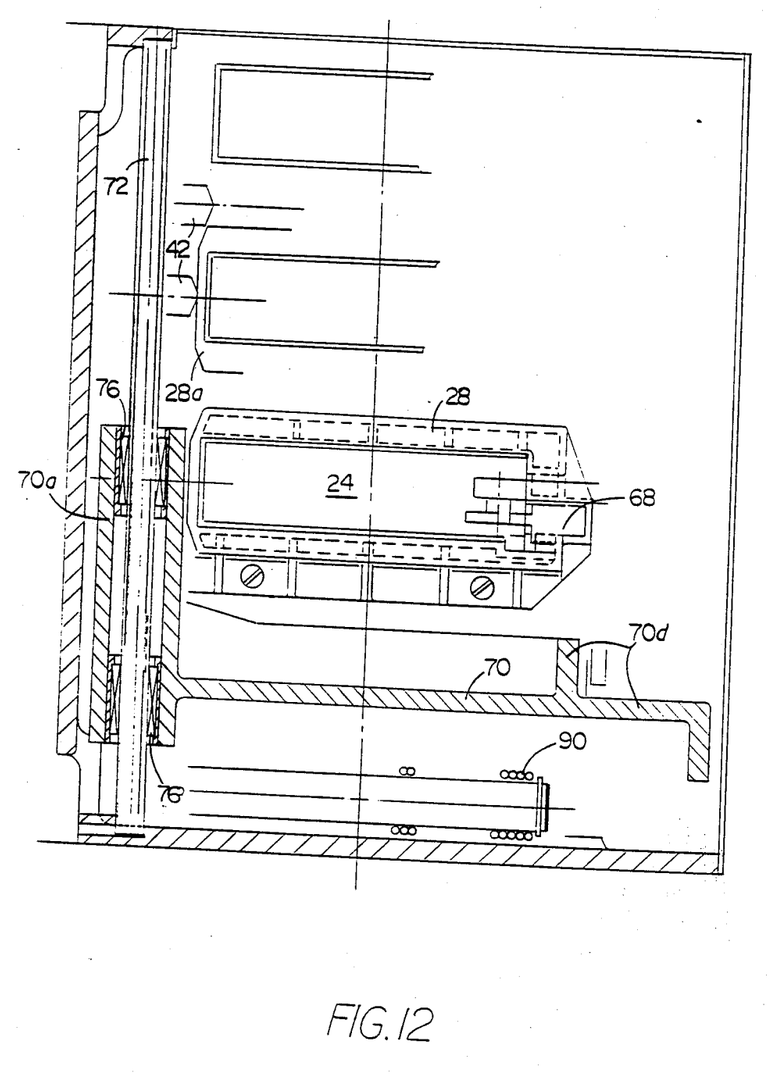
FIG. 12 is a sectional view of the vertical embodiment taken along lines 12—12 of FIG. 11.
Figure 13:
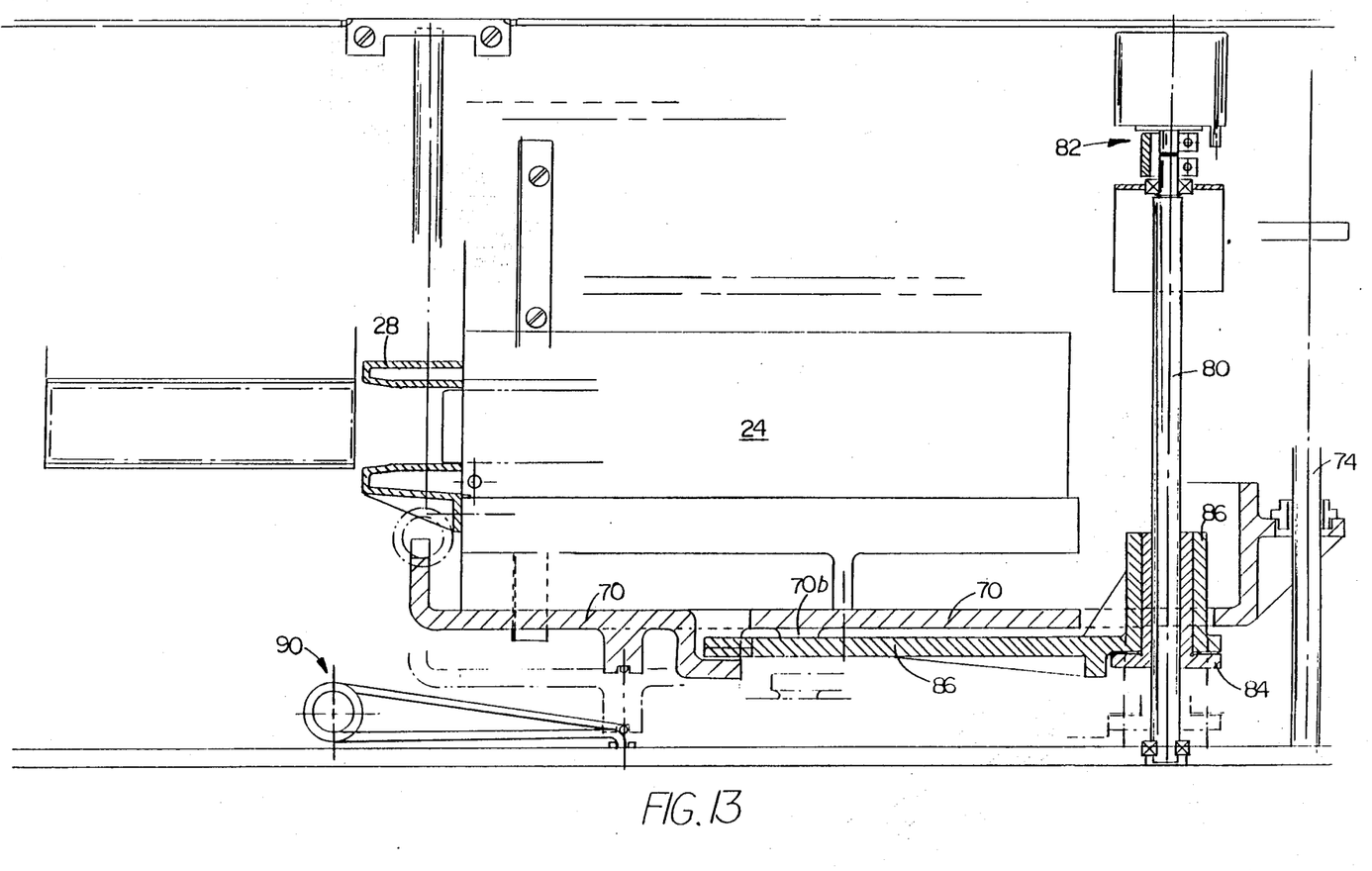
FIG. 13 is a sectional side view taken along lines 13—13 of FIG. 11.

As shown in FIG. 10, a rack of five slots is mounted vertically in a standard half rack enclosure. Note that the manipulator arm 32 connected to the carriage rides up and down along the outside of the rack 10. The elevator consists of a movable platform 70 on which the tape drive 24 and arm 32 (not shown) are supported. The platform 70 rides on a pair of parallel inner and outer rails 72 and 74 near the back wall of the cabinet. The platform 70 is an integral molding including sleeve 70a with spaced, aligned bearings 76 coaxially received on the inner rail 72. Lead screw 80 is driven by motor 82. Nut 84 is drivingly received on screw 80 and supports elevator arm 86. Arm 86 cantilevered from the lead screw 80 like a shelf bracket contacts knob 70b on the bottom of the platform 70 for support. Spring 90 assists in smoothly raising and lowering the platform 70 and keeping it level by applying upward force to notches 70c formed on the bottom of the platform. When lead screw 80 is turned by motor 82, nut 84 travels upward carrying arm 86 and platform 70 upward elevating the tape drive 24 and arm 32 (not shown). Arm 32 for extracting cartridges from the rack is partially supported by extension 70d forming a shelf for the bracket 34 (FIG. 9).

The advantages of the invention as illustrated by the foregoing embodiments are numerous. The open rack allows for easy loading and unloading of the cartridges without interference from the automatic cartridge loader mechanism. The manipulator arm mechanism has the cartridge under control at all times because it is either pushing the back of the cartridge during the insertion stroke or pulling on the notch during the extraction stroke. Thus, the position of the cartridge at all times is positively determined. The sacrosanct envelope of the tape drive is never violated during insertion.

The cartridge loader thus makes available a plurality of tape cartridges for random automatic selection. No user interface is required other than loading and unloading the cartridges in the rack. Cartridge loaders implementing these concepts can find useful application where users require very large data storage capacity, backup for a number of disk drives or archival storage.

Other embodiments are within the following claims. For example, although tape cartridges are the primary intended application for the invention, it may be applicable to other forms of data storage media. The lead screw on the arm 32 could be replaced by other linear actuators such as a timing belt and the lead screw on the platform in the vertical embodiment could be replaced, for example, by a jack or other hoisting device.

Other embodiments are within the following claims.

We claim:

1. A drive loading system for data storage modules, comprising
   a rack with slots for a plurality of data storage modules, said rack having a front side and a back side;
   a carriage movable alongside said front side of said rack to a desired position to select a module;
   a drive mounted on said carriage to receive and utilize a selected module as a storage medium; and
   a linear actuator supported by said carriage having a linear insertion stroke for removing said selected module from a slot in said rack and inserting it into said drive and an extraction stroke for withdrawing said module from said drive and returning said module to said rack, said linear actuator including a rigid pawl articulated with respect to a portion of said linear actuator.

2. The system of claim 1, wherein said pawl is mounted pivotably on a portion of said linear actuator and positioned to positively engage said module during the extraction stroke to pull said module out of said drive back into its respective slot in said rack.

3. The system of claim 2, wherein said pawl in said linear actuator in the insertion stroke pushes said module out of the respective slot into said drive.

4. The system of claim 1, wherein said linear actuator includes an arm mounted on said carriage extending around said rack to said back of said rack.

5. The system of claim 4, wherein said linear actuator further includes a lead screw assembly carried by and parallel to said arm.

6. The system of claim 1, wherein said linear actuator includes a first bidirectional linear drive system, a traveller coupled to said linear drive system and advanced thereby, a module mover coupled to said traveller.

7. A drive loading system for data storage modules, comprising
   a rack with slots for a plurality of data storage modules;
   a carriage movable alongside said rack to a desired position to select a module;
   a drive mounted on said carriage to receive and utilize a selected module as a storage medium; and
   a linear actuator supported by said carriage having an insertion stroke for removing said selected module from a slot in said rack and inserting it into said drive and an extraction stroke for withdrawing said module from said drive and returning said module to said rack, said actuator including a first bidirectional linear drive system, a traveller coupled to said linear drive system and advanced thereby, and a module mover coupled to said traveller, said module mover including a movable frame, a surface connected to the frame for pushing against a mating surface of the module on the insertion stroke and an implement connected to the frame to catch hold of said module to withdraw it during the extraction stroke.

8. A drive loading system for data storage modules, comprising
   a rack with slots for a plurality of data storage modules,
   a carriage movable alongside said rack to a desired position to select a module,
   a drive mounted on said carriage to receive and utilize a selected module as a storage medium; and
   a linear actuator supported by said carriage having an insertion stroke for removing said selected module from a slot in said rack and inserting it into said drive and an extraction stroke for withdrawing said module from said drive and returning said module to said rack, said actuator including a first bidirectional linear drive system, a traveller coupled to said linear drive system and advanced thereby, and a module mover resiliently slidably coupled to said traveller.

9. The system of claim 8, wherein said drive includes an insertion lever, and said linear actuator further includes a projection on said traveller for tripping said lever at the end of said insertion stroke.

10. The system of claim 9, wherein said module includes an exterior notch, said implement being a pawl pivotably mounted to the frame of said module mover for engaging said notch.

11. The system of claim 10, wherein said linear actuator further comprises a back stop mounted to said arm on the side of the said rack opposite from the side adjacent said carriage, said pawl having an extension positioned to engage said back stop at the end of the extraction stroke to pivot the pawl out of the way to disengage the notch on the module as the module is returned to the respective slot and allow the carriage to advance to a new position along the rack.

12. The system of claim 11, wherein the pivot point of said pawl is positioned to create an interference fit between said notch and said pawl during the extraction stroke.

13. The system of claim 12, wherein said pawl has a crank with an arm ending in a tooth to engage said notch, said crank having a surface between the tooth and the pivot point for pushing against the back of the module during the insertion stroke.

14. The system of claim 13, wherein said tooth extends into but does not apply driving force to said notch during the insertion stroke.

15. The system of claim 13, further including a pivot retraction projection on said carriage, said crank having an extension engaged by said projection at the end of the insertion stroke to pivot the toothed arm of the pawl out of the way.

16. The system of claim 15, further comprising a second linear drive system for translating said carriage, said first and second drive systems being orthogonally arranged.

17. The system of claim 16, wherein said rack is vertically oriented so that the modules form a stack,
a carriage elevator including a horizontal platform supporting said drive, said lead screw drive having a vertical lead screw located at one side of the platform, a traveller on the lead screw, an elevator arm extending horizonally from said traveller, said elevator arm supporting said platform at a midpoint underneath the platform.

18. A drive loading system for data storage modules, comprising
a vertical rack with parallel slots for a stack of data storage modules;
an elevator carriage movable vertically alongside said rack to a desired position to select a module;
a drive mounted on said carriage to receive and utilize a selected module as a storage medium, said drive having an insertion/lock lever; and
a linear actuator mounted on said carriage having an insertion stroke for removing said selected module from a slot in said rack and inserting it into said drive and actuating said insertion/lock lever which enables said drive to operate, and an extraction stroke for withdrawing said module from said drive and returning said module to the same slot in said rack.

19. The system of claim 18, wherein said drive is horizontal.

20. The system of claim 18, wherein said elevator carriage includes a horizontal elevator platform carrying said drive.

21. A drive loading system for data storage modules, comprising
a vertical rack with parallel slots for a stack of data storage modules;
an elevator carriage movable vertically alongside said rack to a desired position to select a module, said elevator carriage including a horizontal elevator platform carrying said drive;
a drive mounted on said carriage to receive and utilize a selected module as a storage medium,
a linear actuator mounted on said carriage having an insertion stroke for removing said selected module from a slot in said rack and inserting it into said drive and an extraction stroke for withdrawing said module from said drive and returning said module to the same slot in said rack, and
a vertical lead screw at one side of the platform, a traveller on the lead screw, an elevator arm extending horizontally from said traveller, said elevator arm supporting said platform at a midpoint underneath the platform.

22. The system of claim 21, further comprising a spring underneath the platform urging it upwards.

23. The system of claim 22, wherein said modules are magnetic tape cartridges.

24. A data storage cartridge loading method comprising
placing cartridges in slots in an open rack,
moving a carriage supporting a drive for utilizing a selected cartridge into operative alignment with a slot,
advancing a cartridge toward the drive in an insertion stroke by pushing the cartridge from its end farthest from the drive with a linear actuator, and
retracting the cartridge by hooking a notch on the cartridge and dragging the cartridge back into its slot in the rack by means of the same linear actuator.

25. The method of claim 24, further comprising using the same linear actuator to actuate an insertion/lock lever on the drive in coordination with the insertion stroke to activate the drive.

26. The method of claim 24, further comprising orienting the rack vertically and using an elevator to move the carriage.

27. A drive loading system for data storage modules, comprising
a rack with slots for a plurality of data storage modules, said rack having a front side and a back side;
a carriage movable alongside said front side of said rack to a desired position to select a module;
a drive mounted on said carriage to receive and utilize a selected module as a storage medium; and
a linear actuator supported by said carriage having an insertion stroke for removing said selected module from a slot in said rack and inserting it into said drive and an extraction stroke for withdrawing said module from said drive and returning said module to said rack, said linear actuator including an arm mounted on said carriage and extending around said rack to said back of said rack.

28. The system of claim 27, wherein said linear actuator further includes a lead screw assembly carried by and parallel to said arm.

29. A drive loading system for data storage modules, comprising
a rack with slots for a plurality of data storage modules, said rack having a front side and a back side;
a carriage movable alongside said front side of said rack to a desired position to select a module;
a drive mounted on said carriage to receive and utilize a selected module as a storage medium; and
a linear actuator supported by said carriage having a linear insertion stroke for removing said selected module from a slot in said rack and inserting it into said drive and an extraction stroke for withdrawing said module from said drive and returning said module to said rack, said linear actuator including a self-locking pawl articulated with respect to a portion of said linear actuator.

30. The system of claim 29, wherein said linear actuator includes a pawl positioned to positively engage said module during the extraction stroke to pull said module out of said drive back into its respective slot in said rack.

31. The system of claim 30, wherein said pawl in said linear actuator in the insertion stroke pushes said module out of the respective slot into said drive.

32. The system of claim 29, wherein said linear actuator includes an arm mounted on said carriage extending around said rack to said back of said rack.

33. The system of claim 32, wherein said linear actuator further includes a lead screw assembly carried by and parallel to said arm.

34. The system of claim 29, wherein said linear actuator includes a first bidirectional linear drive system, a traveller coupled to said linear drive system and advanced thereby, a module mover coupled to said traveller.

35. A data storage cartridge loading method comprising placing cartridges in slots in a rack, arranging a drive for utilizing a selected cartridge in operative alignment with said rack for movement therealong, advancing a cartridge toward the drive in an insertion stroke by pushing the cartridge from its end farthest from the drive, and retracting the cartridge by gripping the cartridge and pulling it out of the drive.

36. A data storage cartridge loader, comprising rack means for receiving cartridges in slots, means for arranging a drive for utilizing a selected cartridge in operative alignment with said rack means for movement therealong, means for advancing a cartridge from the rack in the direction of the drive during an insertion stroke by pushing the cartridge from its end farthest from the drive, and means for retracting the cartridge from the drive by gripping the cartridge and pulling it out of the drive.

* * * * *